(No Model.)
W. E. PRALL.
MEANS FOR SUPPLYING STEAM AND HOT WATER FOR POWER AND HEATING PURPOSES.
No. 386,348. Patented July 17, 1888.
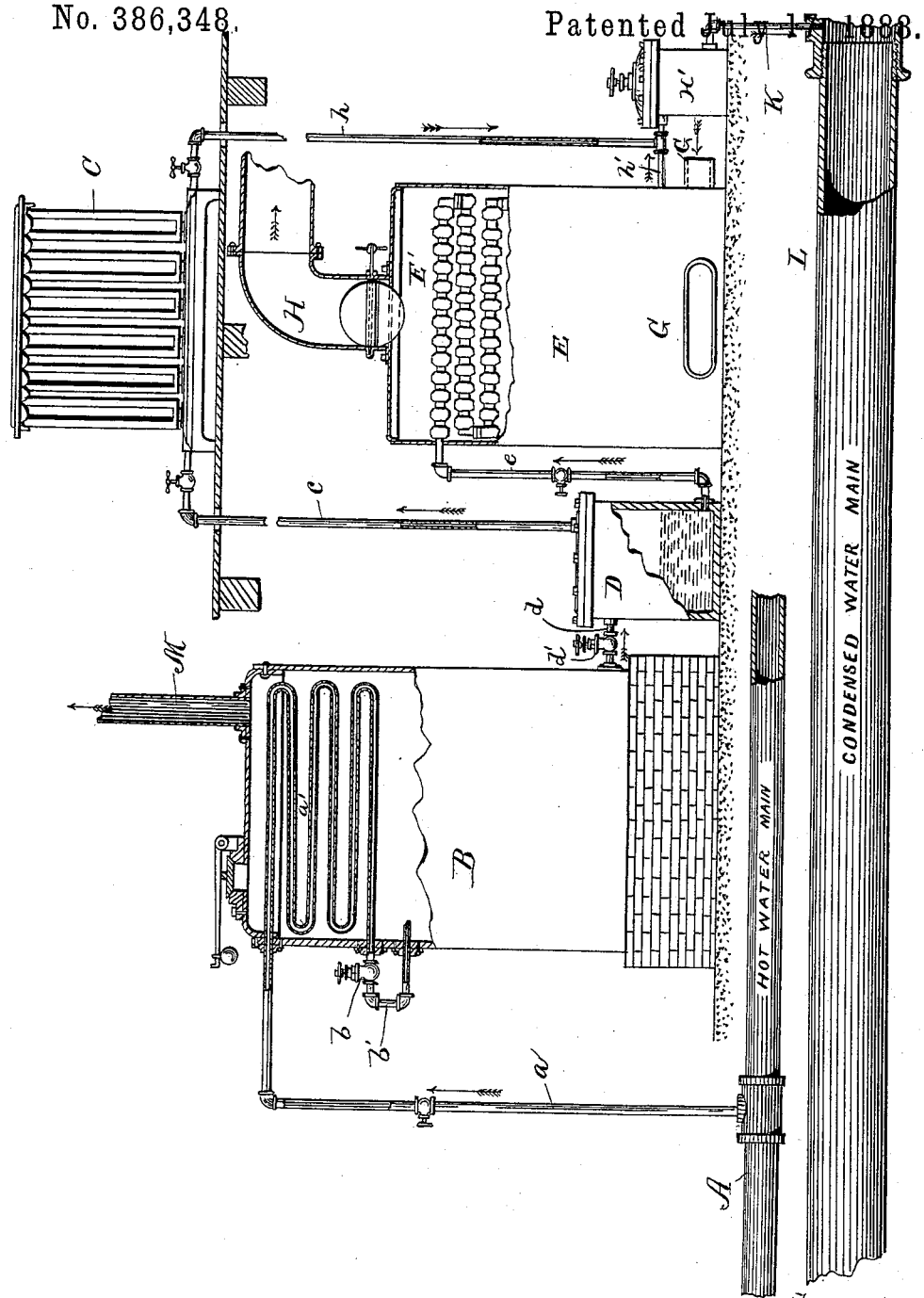
Witnesses,
Ira R. Steward
Inventor,
Wm. E. Prall.
By his Attorney

UNITED STATES PATENT OFFICE.

WILLIAM E. PRALL, OF WASHINGTON, DISTRICT OF COLUMBIA, ASSIGNOR TO THE NATIONAL HEATING COMPANY, OF NEW YORK, N. Y.

MEANS FOR SUPPLYING STEAM AND HOT WATER FOR POWER AND HEATING PURPOSES.

SPECIFICATION forming part of Letters Patent No. 386,348, dated July 17, 1888.

Application filed February 24, 1888. Serial No. 265,200. (No model.)

*To all whom it may concern:*

Be it known that I, WILLIAM E. PRALL, a citizen of the United States, and a resident of Washington, in the District of Columbia, have invented certain new and useful Means for Supplying Steam and Hot Water for Power and Heating Purposes, of which the following is a specification.

My invention relates to a novel means of supplying steam and hot water for power and heating purposes, and is disclosed in the following description and claims, reference being had to the accompanying drawing, forming part of the description, which represents my improvement partly in section and partly in elevation, and in which like letters of reference designate similar parts wherever found.

My invention is designed, primarily, to be used in connection with my system of supplying heat and power as exhibited in United States Patents No. 208,633, granted October 1, 1878, and No. 376,830, granted January 24, 1888, in which superheated water is furnished from a central supply-station, from which steam for any purpose is produced at the points where the same is required simply by reducing the pressure and allowing the superheated water to expand into steam. It is evident, however, as will hereinafter appear, that the present invention may be used in connection with any system or means for supplying heat and power from superheated water, the object being to supply steam at high pressure for power purposes and at a lower pressure for heating purposes, and also to circulate the water of condensation for the purposes of direct or indirect radiation.

In the accompanying drawing, A represents a superheated-water main which is in communication with a heater, as in the patents hereinbefore referred to.

B is a converter or steam-vessel, in communication with the main A by means of a pipe, $a$, which is provided with a differential pressure-reducing valve, $b$, of any approved construction. The vessel B is provided with a coil, $a'$, in the upper part thereof, which communicates with or forms a part of the pipe $a$, and is also in communication with the valve $b$. The valve $b$ is located outside of the vessel B, as shown, and is provided with a pipe, $b'$, which forms a communication between said valve and the vessel B.

D is a second converter or steam-vessel, in communication with the vessel B at the lower part thereof by means of a pipe, $d$, which is provided with a differential pressure-reducing valve, $d'$, similar to that indicated at $b$.

C is a radiator of any desired construction, connected with the vessel D by a pipe, $c$, and E is a hot-air-chamber casing provided with a circulating-coil, E', which is in communication with the lower part of the vessel D by means of a pipe, $e$. The casing E has ingress-opening G at the bottom thereof, by which air is admitted thereto, and at the top a pipe, H, by which the hot air may be conveyed to the various apartments of a building for heating purposes.

H' indicates a steam or condense-water trap, which is in communication with the radiator C by means of a pipe, $h$, and with the circulating-coil E' in the casing E by means of a pipe, $h'$. The steam or condense-water trap H' is also provided with a pipe, K, by which the water of condensation is removed from the building where this system may be located, and if this improvement is used in connection with my system of supplying heat and power from a central station, as exhibited in the patents hereinbefore referred to, the pipe K may be in communication with a return or condense-water main, L, as shown, by which the water of condensation is returned to the heater.

The pipes $a$, $d$, $c$, $e$, $h$, $h'$, and K, by which communication between the superheated-water supply and the vessels B D, the radiator C, coil E', trap H', &c., is established, are of course to be supplied with the necessary valves to control the circulation.

The operation is as follows: Water highly heated—say from 350° to 400° Fahrenheit—is taken from the supply-main A under pressure by means of the pipe $a$, passes through the coil $a'$ in the upper part of the converter or vessel B to the pressure-reducing valve $b$, where the pressure is reduced to any extent desired, from which it is conveyed to the interior of the vessel D by pipe $b'$, where it or a portion thereof immediately expands into steam. The differential valve $b$ may be constructed to establish any ratio of difference desired, and it is evident that by means of the coil $a'$, which has a much higher temperature than the steam in vessel B after passing through the reducing-valve, the steam formed in the converter or vessel B will be superheated and retained at high pressure and may be conveyed by means of a pipe, M, to any point within a building where my improvement may be located for power or cooking purposes or applied to any other use for which high pressure steam is adapted. The superheated water admitted into vessel B will not, however, all be converted into steam by its own specific heat. A portion thereof, which is still heated far above the steam-generating point, collects in the bottom of said vessel B, from which it passes under pressure through pipe $d$ into vessel D, where steam at a lower pressure than that in vessel B is formed, which is conveyed by pipe $c$ to the radiator C. The formation of steam and the deposition or collection of the superheated water in vessel D are the same as in vessel B, the only difference being one of the degree of pressure of the steam and hot water. The steam formed in this instance, however, is amply sufficient for heating purposes either by direct or indirect radiation.

The differential valve $d'$ may be omitted, if desired, as it is evident that in this relation it is not absolutely necessary, as the flow of the superheated water through the pipe $d$ may be controlled with sufficient exactness by any ordinary valve. The water which collects in vessel D is still heated sufficiently high for the purposes of heating by circulation through coils or radiators either for direct or indirect radiation, and in this case is conveyed from vessel D by pipe $e$ into and through coil $E'$ in the casing E, and after passing through said coil it is conveyed into trap $H'$, into which the water of condensation from radiator C is also discharged, and from trap $H'$ the water passes to the return-main L, by which it is returned to the heater, or it may be discharged as waste into the sewer.

My invention is not limited to the construction, location, and arrangement of parts shown and described herein, any construction or system of devices that will operate in substantially the same manner to produce the same result being deemed within the scope thereof.

Having thus fully described my invention, its construction, and operation, I claim and desire to secure by Letters Patent of the United States—

1. The combination, in a system for supplying steam for power and heating purposes, of a superheated-water supply, a vessel provided with a pressure-reducing valve, the vessel and valve being in communication with the supply, and a second vessel communicating with the first at or near the bottom, each of said vessels being provided with steam-pipes, substantially as shown and described.

2. In a system for supplying power and heat, the combination of a superheated-water supply, a vessel provided with a differential pressure-reducing valve, the vessel and valve being in communication with the supply and the vessel being provided with a steam-pipe, a second vessel communicating with the first at or near the bottom, and a radiator in communication with the second vessel, substantially as shown and described.

3. In a system for supplying steam and hot water for power and heating purposes, the combination of a superheated-water supply, a vessel provided with a differential pressure-regulating valve, the vessel and valve being in communication with the supply, a second vessel communicating with the first at or near the bottom, a radiator in communication with this vessel by means of a steam-pipe, and a hot-water coil or radiator communicating with the last-named vessel at or near the bottom by means of a water-pipe, substantially as shown and described.

4. In a system for supplying power, the combination, with a superheated-water supply, of a vessel, as B, a coil in the top thereof in communication with said supply, and a pressure-reducing valve in communication with the coil and provided with means for discharging the superheated water into said vessel, substantially as shown and described.

5. In a system for supplying power and heat, the combination of a superheated-water supply, a vessel provided with an outlet for steam and having a coil therein in communication with said supply, said coil being provided with a pressure-reducing valve, a second vessel in communication with the first at or near the bottom, and a radiator or other means for utilizing heat in communication with the second vessel, substantially as shown and described.

6. In a system for supplying power and heat, the combination of a superheated-water supply, a vessel having an outlet for steam and provided with a coil therein in communication with said supply, a second vessel in communication with the first at or near the bottom, a radiator in communication with the top of said second vessel, and a water coil or radiator communicating with the bottom thereof, substantially as shown and described.

7. In a system for supplying steam for power and heating purposes, the combination of a superheated-water supply, a vessel, as B, in communication with the supply, in which a portion of the superheated water is converted into high-pressure steam by allowing it to expand, said vessel being provided with a steam-pipe for conveying the steam to a stationary engine or other means for utilizing the same, a second vessel, as D, in communication with the first at or near the bottom thereof, in which the superheated water not converted into steam at the first expansion is converted into low-pressure steam by allowing it to expand, a radiator or other means for utilizing the low-pressure steam thus formed, and means for returning the water of condensation to the heater, substantially as shown and described.

Signed at New York, in the county of New York and State of New York, this 10th day of February, A. D. 1888.

WM. E. PRALL.

Witnesses:
DANIEL E. DELAVAN,
WILLIAM EGAN.